(12) United States Patent
Arnett

(10) Patent No.: US 7,784,487 B2
(45) Date of Patent: Aug. 31, 2010

(54) FUEL METERING VALVE ASSEMBLY INCLUDING THERMAL COMPENSATION MECHANISM

(75) Inventor: Eric M. Arnett, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 434 days.

(21) Appl. No.: 11/923,343

(22) Filed: Oct. 24, 2007

(65) Prior Publication Data

US 2009/0301575 A1 Dec. 10, 2009

(51) Int. Cl.
*F16K 31/64* (2006.01)
(52) U.S. Cl. .................. 137/468; 60/39.281; 60/730; 137/554
(58) Field of Classification Search .............. 137/468, 137/554; 60/39.281, 730
See application file for complete search history.

(56) References Cited

U.S. PATENT DOCUMENTS

| 2,274,145 | A |   | 2/1942  | Johnson |
| 2,278,437 | A |   | 4/1942  | Gentzel |
| 2,667,892 | A |   | 2/1954  | Gentzel |
| 4,971,005 | A | * | 11/1990 | Dyer et al. .................. 123/381 |
| 5,715,674 | A | * | 2/1998  | Reuter et al. ............. 60/39.281 |
| 5,795,998 | A | * | 8/1998  | Smith ...................... 73/114.42 |

FOREIGN PATENT DOCUMENTS

| GB | 689771 | 4/1953 |
| GB | 689772 | 4/1953 |

\* cited by examiner

*Primary Examiner*—Stephen Hepperle
(74) *Attorney, Agent, or Firm*—Ingrassia Fisher & Lorenz, P.C.

(57) ABSTRACT

A metering valve assembly is provided for metering a fluid. The metering valve assembly includes a position sensor, metering valve, and a thermal compensation mechanism. The metering valve includes a valve housing having a flow passage therethrough, and a valve element movably mounted within the valve housing. The thermal compensation mechanism is coupled between the position sensor and the valve element and configured to adjust the displacement of the position sensor relative to the valve element as a function of fluid temperature.

20 Claims, 4 Drawing Sheets

US 7,784,487 B2

FUEL METERING VALVE ASSEMBLY INCLUDING THERMAL COMPENSATION MECHANISM

TECHNICAL FIELD

The present invention relates generally to an aircraft fuel delivery and control system and, more particularly, to a fuel metering valve assembly including a thermal compensation mechanism configured to compensate for changes in fuel density.

BACKGROUND

Fuel delivery and control systems are deployed on aircraft to supply metered amounts of fuel to combustors associated with the aircraft's gas turbine engines. In a generalized fuel delivery and control system, a metering valve is fluidly coupled between a fuel source (e.g., one or more storage tanks) and the engine combustors. The metering valve includes a valve element (e.g., a piston) that is slidably mounted within a valve housing (e.g., a sleeve). The valve element is movable between an open position, a closed position, and various intermediate positions. The position of the valve element is adjusted by a valve actuator, which is, in turn, controlled by an engine controller. During operation of the fuel delivery and control system, the engine controller determines a desired flow rate through the metering valve and commands the valve actuator to adjust the position of the valve element to achieve the desired flow rate.

During flight, the temperature of the fuel conducted by a fuel delivery and control system may vary between, for example, approximately −46° Celsius (−50° Fahrenheit) to approximately 93° Celsius (200° Fahrenheit). As the fuel's temperature increases, the fuel's density decreases. If the fuel delivery and control system does not account for this change in fuel density, the system might not provide a consistent mass flow rate to the engine combustors over the operative temperature range. One known fuel delivery and control system regulates mass flow rate by employing a bypass valve that increases pressure upstream of the fuel metering valve as fuel temperature rises. The bypass valve is positioned downstream of a high pressure pump and is biased toward a closed position by a spring disposed within the bypass valve housing. The spring seats on a stack of bi-metallic discs. When heated by the fuel flowing through the bypass valve, the stack of bi-metallic discs expands and exerts a compressive force on the spring. The spring then exerts a greater bias force on the valve element, and less fuel is redirected back to the inlet of the high pressure pump. As a result, the pressure upstream of the fuel metering valve, and the volumetric flow through the metering valve, is increased. This increase in volumetric flow offsets the corresponding decrease in fuel density thereby maintaining a substantially consistent mass flow rate through the metering valve.

Although fuel delivery and control systems of the type described above are generally effective at regulating mass flow rate over an operative temperature range, such systems are limited in certain respects. For example, to achieve sufficient displacement of the bypass valve spring, an undesirably large number of bi-metallic discs may be needed. Certain fuel delivery and control systems have eliminated the need for such a stack of bi-metallic discs by continually monitoring fuel temperature and utilizing software to compensate for changes in fuel density; however, such systems require additional hardware components (e.g., a resistance temperature device).

It should thus be appreciated that it would be desirable to provide a fuel metering valve assembly that compensates for changes in fuel density over an operative temperature range that is reliable, lightweight, and relatively inexpensive to implement. Other desirable features and characteristics of the present invention will become apparent from the subsequent detailed description of the invention and the appended claims, taken in conjunction with the accompanying drawings and this background of the invention.

BRIEF SUMMARY

A metering valve assembly is provided for metering a fluid, such as fuel. The metering valve assembly includes a position sensor, metering valve, and a thermal compensation mechanism. The metering valve includes a valve housing having a flow passage therethrough, and a valve element movably mounted within the valve housing. The thermal compensation mechanism is coupled between the position sensor and the valve element and configured to adjust the displacement of the position sensor relative to the valve element as a function of fluid temperature.

A fuel delivery and control system is also provided for supplying a metered amount of fuel to an aircraft engine combustor having an engine controller associated therewith. The fuel delivery and control system includes a fuel source and a metering valve fluidly coupled between the fuel source and the aircraft engine combustor. The metering valve includes a valve housing having a flow passage therethrough, and a valve element movably mounted within the valve housing. A position sensor is coupled to the valve element and separated therefrom by a displacement gap. The position sensor is also coupled to the engine controller and configured to relate thereto the sensed position of the valve element. A valve actuator is coupled to the valve element and to the engine controller. The valve actuator is configured to adjust the position of the valve element in accordance with command signals received from the engine controller. A thermal compensation mechanism is coupled between the valve element and the position sensor. The thermal compensation mechanism is configured to increase the width of the displacement gap as the fuel's temperature increases over an operative temperature range.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
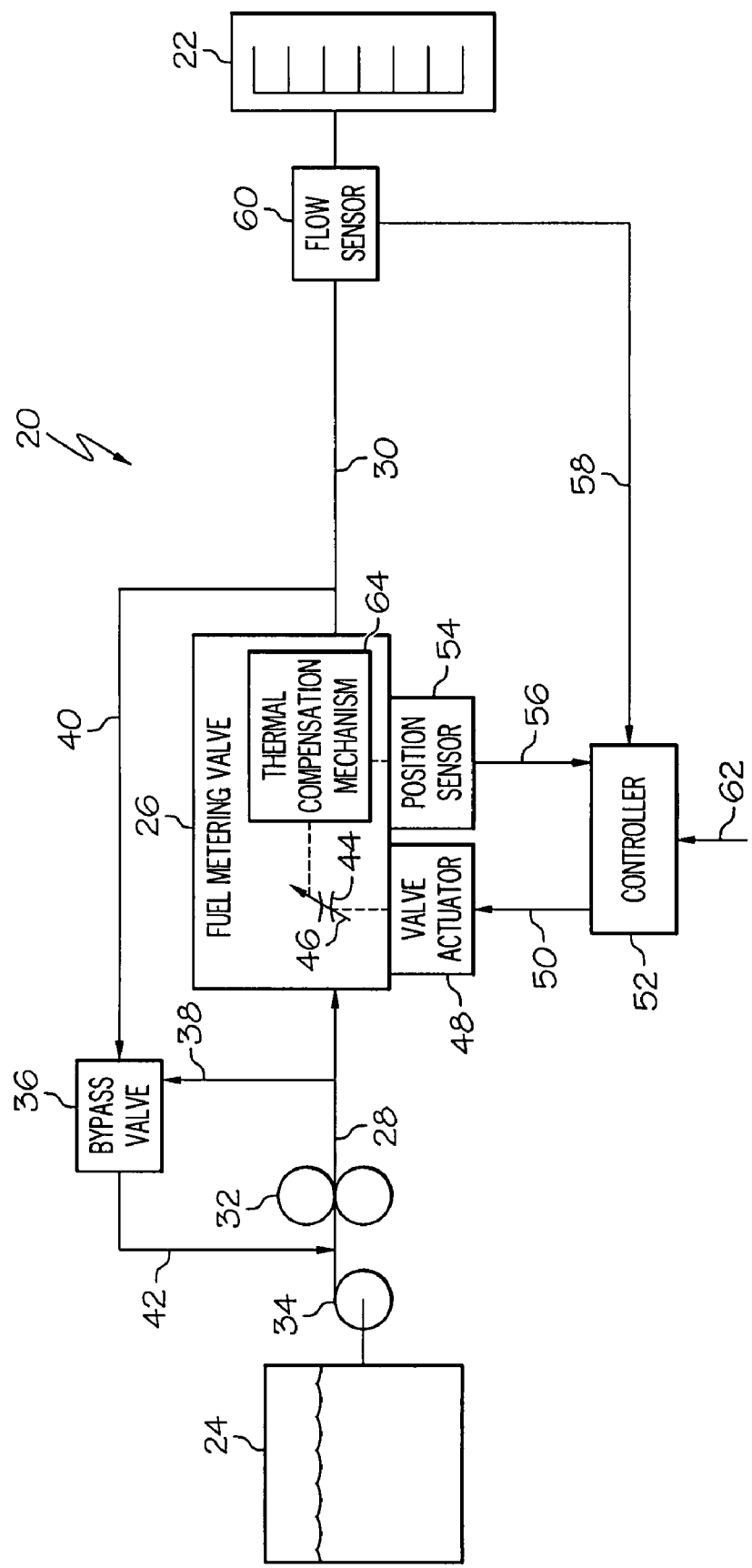
FIG. 1 is a schematic diagram of an aircraft fuel delivery and control system including a fuel metering valve assembly having a thermal compensation mechanism in accordance with a first exemplary embodiment.

FIG. 1 is a simplified schematic diagram of an exemplary fuel delivery and control system 20 suitable for supplying a metered amount of fuel to at least one combustor 22 (or other such fuel load) associated with an aircraft's gas turbine engine. Fuel delivery and control system 20 is shown in FIG. 1 and will be described below as including only certain components useful for descriptive purposes; however, it will be understood that, in actual practice, system 20 may include additional or alternative components that are conventional in the field and not shown in FIG. 1 for clarity. Furthermore, although described in the context of an aircraft fuel delivery and control system, it should be noted that embodiments of the inventive metering valve assembly may be employed in conjunction with various types of metering systems, including those that conduct fluids other than fuel.

With reference to FIG. 1, fuel delivery and control system 20 comprises at least one fuel storage tank 24 that is fluidly coupled to a fuel metering valve 26 by way of a first supply line 28. Fuel metering valve 26 is, in turn, fluidly coupled to engine combustor 22 by way of a second supply line 30. A high pressure pump 32 (e.g., a positive displacement pump) is positioned in flow-series along supply line 28 between fuel storage tank 24 and fuel metering valve 26. If desired, a booster pump 34 (e.g., a low horsepower centrifugal pump) may also be fluidly coupled between storage tank 24 and high pressure pump 32 to ensure that an adequate suction head is maintained on high pressure pump 32. When energized, high pressure pump 32 draws fuel from fuel storage tank 24 and supplies the fuel to the inlet of fuel metering valve 26 at a relatively high pressure (e.g., approximately 1200 pounds per square inch). Fuel metering valve 26 selectively impedes the flow of fuel therethrough to adjust the flow rate to engine combustor 22 as will be described in detail below.

In the illustrated exemplary embodiment shown in FIG. 1, a bypass valve 36 is disposed upstream of fuel metering valve 26. Bypass valve 36 includes a first inlet, which is fluidly coupled to supply line 28 via a first bypass line 38 at a location downstream of high pressure pump 32, and a second inlet, which is fluidly coupled to supply line 30 via a second bypass line 40 at a location downstream of fuel metering valve 26. An outlet of bypass valve 36 is fluidly coupled to supply line 28 via a third bypass line 42 at a location upstream of high pressure pump 32. During operation, bypass valve 36 maintains a substantially constant pressure drop across fuel metering valve 26 by selectively diverting a portion of the fuel received at the inlet coupled to bypass line 38 through the outlet coupled to bypass line 42 and, thus, back to the inlet of high pressure pump 32 in the well-known manner. This example notwithstanding, it should be understood that, in alternative embodiments, other pressure regulating devices (e.g., a throttle valve) may be employed in place of, or in addition to, bypass valve 36.

As schematically illustrated in FIG. 1, fuel metering valve 26 has a flow passage 44 formed therethrough in which a valve element 46 is mounted. Valve element 46 may be moved between a variety of positions to control the flow rate through flow passage 44 and, thus, to engine combustor 22. A valve actuator 48 (e.g., an electro-hydraulic servo valve, an electrical actuator, etc.) is coupled to valve element 46 and adjusts the position of valve element 46 within flow passage 44 in accordance with command signals 50 received from an engine controller 52 (e.g., full authority digital engine controller). A position sensor 54 is operatively coupled to valve element 46 and sends valve element position signals 56 to engine controller 52 indicative of the position of valve element 46 within flow passage 44. Position sensor 54 may comprise any device suitable for monitoring the position of valve element 46 in this manner. A non-exhaustive list of devices suitable for use as position sensor 54 includes a linear variable differential transformer (LVDT), a rotary variable differential transformer (e.g., a resolver), a float-type sensor (e.g., a potentiometer), and the like.

As indicated above, engine controller 52 sends command signals 50 to valve actuator 48 to adjust the position of valve element 46 to achieve a desired flow rate through fuel metering valve 26 and to engine combustor 22. Engine controller 52 determines the desired flow rate and the corresponding valve element position utilizing valve element position signals 56 and various other signals indicative of the current operational parameters of system 20. For example, engine controller 52 may also receive a flow rate signal 58 from a flow rate sensor 60 positioned downstream of fuel metering valve 26. In addition, engine controller 52 may receive an input control signal 62 from throttle equipment located in the aircraft cockpit (not shown). The manner in which engine controller 52 utilizes these signals to determine the desired flow rate and the corresponding valve element position (or position adjustment) is conventionally known in the field and is thus not discussed further herein.

The fuel conducted by fuel delivery and control system 20 may experience significant changes in density corresponding to changes in fuel temperature. If fuel delivery and control system 20 does not account for these changes in fuel density, system 20 may have difficulty maintaining a consistent mass flow rate to engine combustor 22 over the operative temperature range; e.g., from approximately −46° Celsius (−50° Fahrenheit) to approximately 93° Celsius (2000 Fahrenheit). This may be more fully appreciated by referring to FIG. 2, which is a graph illustrating the relationship between fuel temperature (horizontal axis) and mass flow rate (vertical axis) through fuel metering valve 26 when compensations are not made for changes in fuel density. As can be seen, when compensations are not made for changes in fuel density, mass flow rate through metering valve 26 decreases as fuel temperature rises. It will be appreciated by one skilled in the art that, in actual practice, the mass flow curve may be characterized by a slight bow (not shown in FIG. 2) as flow is proportional to the square root of density.

Figure 2:
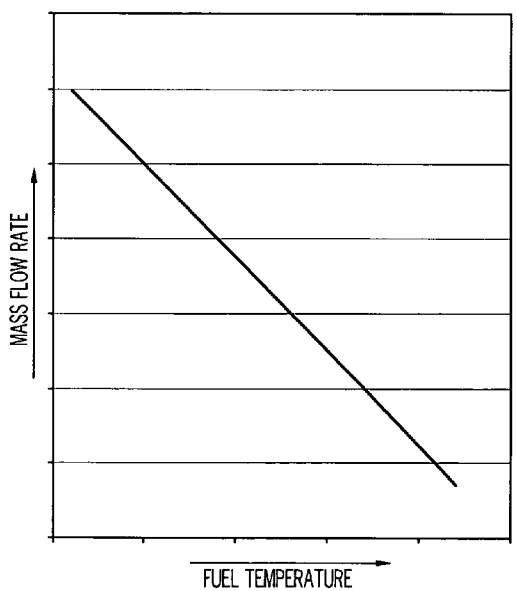
FIG. 2 is a graph illustrating the relationship between fuel temperature (horizontal axis) and mass flow rate (vertical axis) through the fuel metering valve shown in FIG. 1 when compensations are not made for changes in fuel density.
Figure 3:
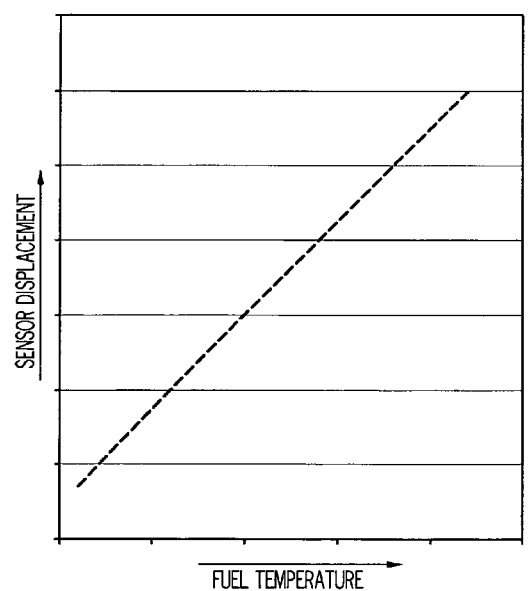
FIG. 3 is a graph illustrating an exemplary relationship between fuel temperature (horizontal axis) and sensor displacement (vertical axis) resulting from the shape change of the exemplary thermal compensation mechanism shown in FIG. 1.

To compensate for changes in fuel density over the operative temperature range, fuel delivery and control system 20 is equipped with a thermal compensation mechanism 64. As indicated in FIG. 1, thermal compensation mechanism 64 may be included as a component of the "fuel metering valve assembly," which, for purposes of the present application, is defined to include thermal compensation mechanism 64, fuel metering valve 26, and position sensor 54. As will be described below in more detail, thermal compensation mechanism 64 is configured to alter displacement of position sensor 54, and thus the valve element position sensed by sensor 54, as fuel temperature increases or decreases; e.g., thermal compensation mechanism 64 may increase the displacement between the input of position sensor 54 and valve element 46 as fuel temperature increases (and, thus, as fuel density decreases). As graphically expressed in FIG. 3, in a preferred embodiment, thermal compensation mechanism 64 is configured to increase the displacement between the input of position sensor 54 and valve element 46 over the operative temperature in a substantially linear manner. Preferably, thermal compensation mechanism 64 is configured such that the slope of sensor input displacement-versus-fuel temperature characteristic (FIG. 3) is substantially the inverse of the slope of mass flow rate-versus-fuel temperature characteristic (FIG. 2).

In a first group of embodiments, thermal compensation mechanism 64 is configured to alter the displacement of the input of position sensor 54 and valve element 46 by undergoing a thermally-induced shape change. More specifically, thermal compensation mechanism 64 may be configured to expand along one or more axes as mechanism 64 is heated by the fuel flowing through fuel delivery and control system 20. Thermal compensation mechanism 64 may comprise any body or device suitable for changing shape (e.g., expanding) in this manner including, but not limited to, a gas-filled bellows or a shape memory alloy device. This notwithstanding, thermal compensation mechanism 64 preferably comprises a bi-metallic body (e.g., a strip, a disc, etc.) formed from two metals or alloys each having a different co-efficient of thermal expansion. To further illustrate this point, a specific example of a fuel metering valve assembly including such a bi-metallic disc will now be described in conjunction with FIGS. 4 and 5.

Figure 4:
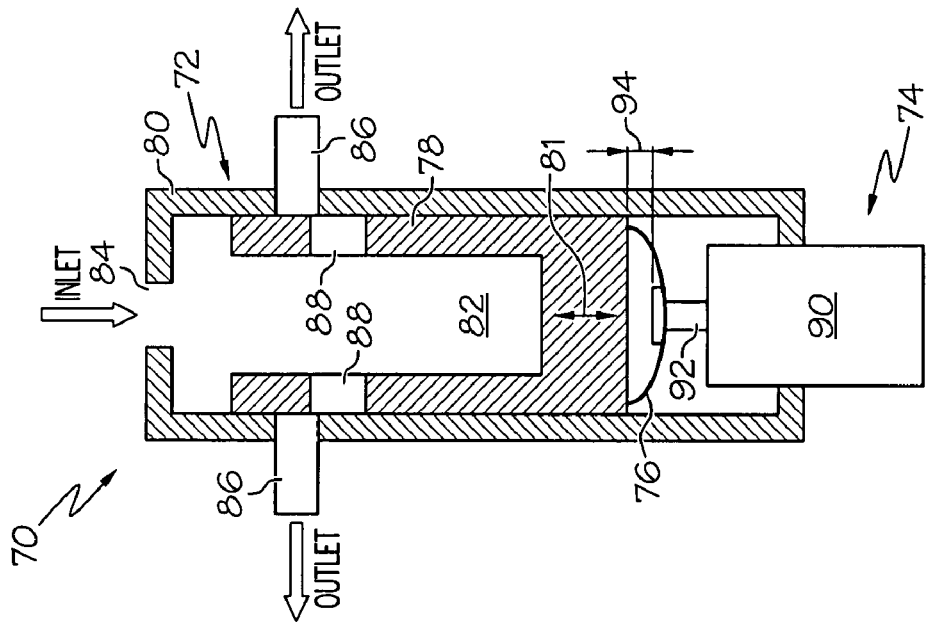
FIGS. 4 and 5 are cross-sectional views of a fuel metering valve assembly in low temperature and high temperature states, respectively, in accordance with a second exemplary embodiment.
Figure 5:
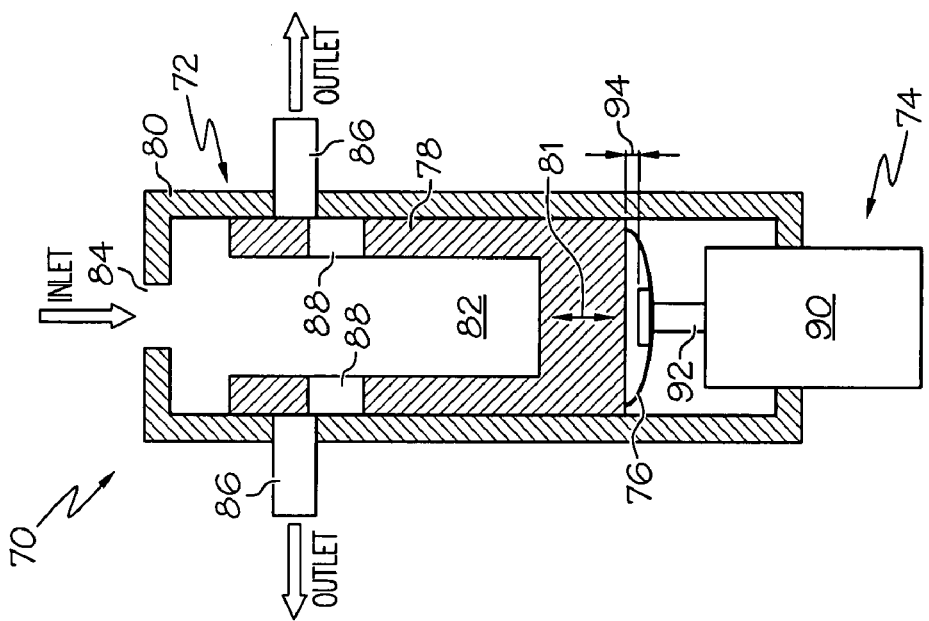

FIGS. 4 and 5 are cross-sectional views of a fuel metering valve assembly 70 in low temperature and high temperature states, respectively, in accordance with an exemplary embodiment. Fuel metering valve assembly 70 comprises three main components, namely, a fuel metering valve 72, a position sensor 74, and a thermal compensation mechanism 76. In practice, various other components may be coupled to, and operate in conjunction with, fuel metering valve assembly 70 (e.g., a valve actuator of the type described above in conjunction with FIG. 1); however, such components are not illustrated in FIGS. 4 and 5 for clarity.

In the exemplary embodiment shown in FIGS. 4 and 5, fuel metering valve 72 assumes the form of a sleeve valve comprising a piston 78 (the valve element) slidably mounted within the bore of a sleeve 80 (the valve housing). Piston 78 is configured to translate along an axis of motion 81 between an open position, a closed position, and various intermediate positions. A flow passage 82, including an inlet 84 and a plurality of outlets 86, is formed through sleeve 80; and a plurality of apertures 88 is formed through a wall of piston 78. When piston 78 is moved into the fully open position, apertures 88 align with outlets 86 and fuel flow through fuel metering valve 72 is substantially unimpeded. Conversely, when piston 78 is moved into the fully closed position, apertures 88 are offset from outlets 86 and fuel flow through fuel metering valve 72 is substantially blocked. Finally, when piston 78 is moved into one of the various intermediate positions, apertures 88 partially align with outlets 86 and fuel flow through fuel metering valve 72 is impeded to some moderate degree. Thus, by positioning and repositioning piston 78 in the manner described above, the flow rate through metering valve 72 may be controlled.

In the illustrated exemplary embodiment, position sensor 74 assumes the form of a linear variable differential transformer (LVDT) comprising a LVDT body 90 having an LVDT core 92 (the sensor input) translatably coupled thereto. Thermal compensation mechanism 76 is fixedly coupled to LVDT core 92 via a fastener 94 (e.g., a bolt); however, thermal compensation mechanism 76 may be coupled to the position sensor input utilizing other connective means as well (e.g., soldering, crimping, welding, etc.). Thermal compensation mechanism 76 may also be coupled to piston 78 utilizing any suitable coupling means. As illustrated in FIGS. 4 and 5, when thermal compensation mechanism 76 assumes the form of a bi-metallic disc, LVDT core 92 may be coupled to an inner portion of the disc and piston 78 may be coupled to the outer rim portion of the disc. Of course, it may also be the case that piston 78 and LVDT core 92 are coupled to the inner portion and to the outer rim portion of the disc, respectively.

Thermal compensation mechanism 76 maintains a displacement gap between LVDT core 92 and piston 78. The width of this gap is generally determined by the dimension of the thermal compensation mechanism 76 measured along axis of motion 81 (or along an axis substantially parallel to axis of motion 81). As indicated above, this dimension of thermal compensation mechanism 76 changes as mechanism 76 is heated (or cooled) by fuel flowing through metering valve assembly 70. This may be appreciated by comparing FIG. 4, which illustrates thermal compensation mechanism 76 in a low temperature state, to FIG. 5, which illustrates thermal compensation mechanism 76 in a high temperature state. As can be seen, the dimension of mechanism 76 as measured along axis of motion 81 is considerably smaller in FIG. 4 than in FIG. 5. As a result, the width of the displacement gap separating LVDT core 82 from piston 78 in FIG. 4 (indicated at 94) is considerably less than the width of the displacement gap in FIG. 5 (indicated at 96). Stated differently, when thermal compensation mechanism 76 assumes the form of a bi-metallic disc, the concavity of thermal compensation mechanism 76 increases as fuel temperature rises. Again, this increase in concavity preferably increases linearly with temperature over the operative temperature range; e.g., from approximately −46° Celsius (−50° Fahrenheit) to approximately 93° Celsius (200° Fahrenheit).

Figure 6:
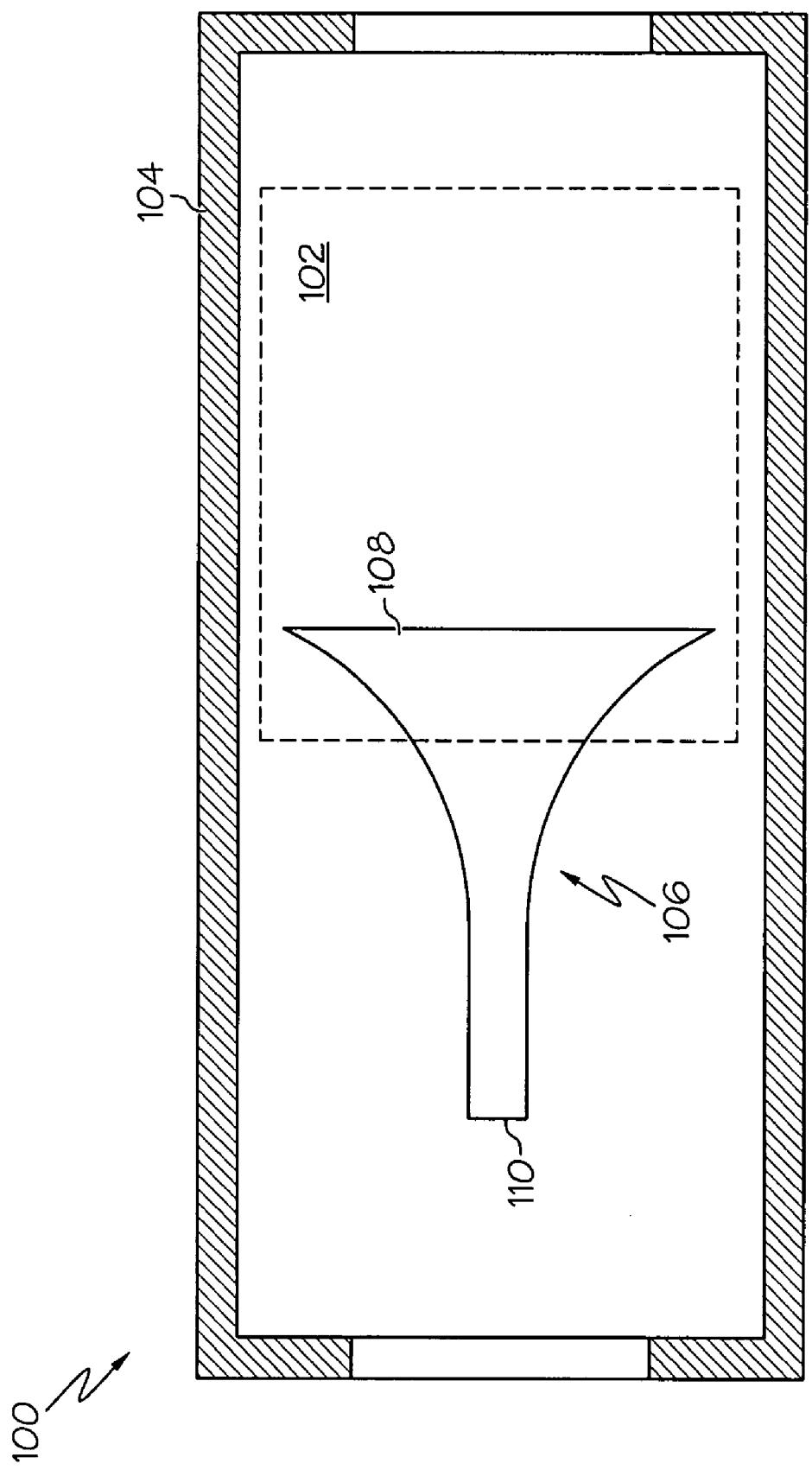
FIG. 6 is a functional cross-sectional view of a fuel metering valve in accordance with a third exemplary embodiment.

Although not shown in FIGS. 4 and 5 for clarity, fuel metering valve 72 preferably includes an exponential port. The exponential port may be formed in either piston 78 or sleeve 80. To further emphasize this point, FIG. 6 provides a simplified cross-sectional view of a fuel metering valve 100 comprising a piston 102 (shown in phantom) slidably mounted within a sleeve 104. Sleeve 104 has an exponential port 106 formed therein, which includes an inlet 108 and an outlet 110. As piston 102 translates within sleeve 104, piston 102 moves relative to exponential port 106 so as to adjust the exposed area of inlet 108 and consequently control the rate of fuel flow through fuel metering valve 100 in the well-known manner. As will be appreciated by one skilled in the art, the provision of an exponential port, such as port 106 shown in FIG. 6, ensures that the displacement of the valve element (e.g., the piston) required to alter the mass flow rate through the metering valve is held constant over a wide range of mass flow rates. As a generalized example, piston 102 may require the same displacement (e.g., 1 millimeter or 0.039 inch) to achieve a 10% change in mass flow rate through metering valve 100 whether the current mass flow rate is 5.4 kilograms (12 pounds) per hour or 540 kilograms (1200 pounds) per hour.

It should thus be appreciated that there has been provided a fuel metering valve assembly that compensates for changes in fuel density over an operative temperature range. In particular, there has been described a fuel metering valve assembly employing a thermal compensation mechanism that adjusts the displacement of a sensor input relative to the valve element as a function of fuel temperature (e.g., the thermal compensation mechanism may increase the width of a displacement gap separating the sensor input and the valve element as fuel temperature rises). This displacement change may be set to correspond to the density change of the metered fluid over the operative temperature range. In this manner, the thermal compensation element adjusts the valve element position sensed by the position sensor to regulate the mass flow rate through the metering valve over an operative temperature range by increasing the flow port area. Advantageously, the thermal compensation mechanism that need produce only a relatively modest change in sensor displacement over the operative temperature range to be effective. As a result, the thermal compensation mechanism may be implemented in a simple form (e.g., a bi-metallic body, such as a single bi-metallic disc) that is reliable, lightweight, and relatively inexpensive to implement.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A metering valve assembly for metering fuel and for use in conjunction with a valve actuator, a controller operably coupled to the valve actuator, and an aircraft engine combustor, the metering valve assembly comprising:
    a position sensor configured to be operably coupled to the controller;
    a metering valve, comprising:
        a valve housing having a flow passage therethrough configured to be fluidly coupled to the aircraft engine combustor; and
        a valve element movably mounted within the valve housing and configured to be moved axially by the valve actuator in accordance with commands received from the controller to provide the aircraft engine combustor with a metered fuel supply; and
    a thermal compensation mechanism coupled between the position sensor and the valve element, the thermal compensation mechanism configured to adjust the displacement of the position sensor relative to the valve element as a function of fluid temperature.

2. A metering valve assembly according to claim 1 wherein the thermal compensation mechanism increases the displacement of the position sensor relative to the valve element as fluid density decreases over an operative temperature range.

3. A metering valve assembly according to claim 1 wherein the position sensor comprises:
    a sensor body coupled to the valve housing; and
    a sensor input movably coupled to the sensor body and fixedly coupled to the thermal compensation mechanism.

4. A metering valve assembly according to claim 3 wherein the position sensor is a linear variable differential transducer.

5. A metering valve assembly according to claim 1 wherein the thermal compensation mechanism maintains a displacement gap between the position sensor and the valve element, the thermal compensation mechanism configured to adjust the width of the displacement gap in relation to changes in fluid temperature.

6. A metering valve assembly according to claim 5 wherein the thermal compensation mechanism is configured to increase the width of the displacement gap in a substantially linear manner as fluid temperature increases over a predetermined temperature range.

7. A metering valve assembly according to claim 6 wherein the predetermined temperature range comprises approximately −46° Celsius to approximately 93° Celsius.

8. A metering valve assembly according to claim 1 wherein the metering valve includes an exponential port.

9. A metering valve assembly according to claim 3 wherein the valve housing comprises a sleeve, and wherein the valve element comprises a piston slidably mounted with the sleeve.

10. A metering valve assembly according to claim 9 wherein the piston is configured to translate along an axis of motion, and wherein the thermal compensation mechanism is configured to adjust the displacement of the sensor input relative to the piston along the axis of motion.

11. A metering valve assembly according to claim 10 wherein the thermal compensation mechanism is configured to expand along the axis of motion as fluid temperature increases.

12. A metering valve assembly according to claim 9 wherein the thermal compensation mechanism is fixedly attached to the sensor input.

13. A metering valve assembly according to claim 1 wherein the thermal compensation mechanism comprises a bi-metallic body.

14. A metering valve assembly according to claim 13 wherein the bi-metallic body comprises a disc.

15. A metering valve assembly for metering a fluid, comprising:
    a metering valve, comprising:
        a valve sleeve having a flow passage therethrough; and
        a valve piston mounted within the valve sleeve and configured to translate therein to control fluid flow through the flow passage, the valve piston configured to move in a first direction from a closed position to an open position;
    a position sensor, comprising:
        a sensor body coupled to the valve sleeve; and
        a sensor input movably coupled to the sensor body; and
    a thermal compensation mechanism coupled between the sensor input and the valve piston, the thermal compensation mechanism configured to be heated by the fluid and, when so heated, to move the sensor input away from the metering valve piston in a second direction substantially opposite the first direction, and an actuator responsive to sensor input moving the valve piston in an axial direction.

16. A metering valve assembly according to claim 15 wherein the thermal compensation mechanism comprises a bi-metallic disc.

17. A metering valve assembly according to claim 16 wherein the bi-metallic disc is at least partially concave and increases its concavity as fuel temperature rises.

18. A fuel delivery and control system for supplying a metered amount of fuel to an aircraft engine combustor having an engine controller associated therewith, the fuel delivery and control system comprising:
    a fuel source;
    a metering valve fluidly coupled between the fuel source and the aircraft engine combustor, the metering valve comprising:
        a valve housing having a flow passage therethrough; and
        a valve element movably mounted within the valve housing;

a position sensor coupled to the valve element and separated therefrom by a displacement gap, the position sensor further coupled to the engine controller and configured to relate thereto the sensed position of the valve element;

a valve actuator coupled to the valve element and to the engine controller, the valve actuator configured to axially adjust the position of the valve element in accordance with command signals received from the engine controller; and a thermal compensation mechanism coupled between the valve element and the position sensor, the thermal compensation mechanism configured to increase the width of the displacement gap as the fuel's temperature increases over an operative temperature range.

19. A fuel delivery and control system according to claim 18 wherein the thermal compensation mechanism is configured to expand, as measured along a first axis, as the fuel's temperature increases.

20. A fuel delivery and control system according to claim 19 wherein the valve element is configured to translate within the valve housing along a second axis, the second axis being substantially parallel with the first axis.

* * * * *